July 31, 1962
L. R. VAN NOY ETAL
3,047,704
STRIP HEATER
Filed April 22, 1959
3 Sheets-Sheet 1
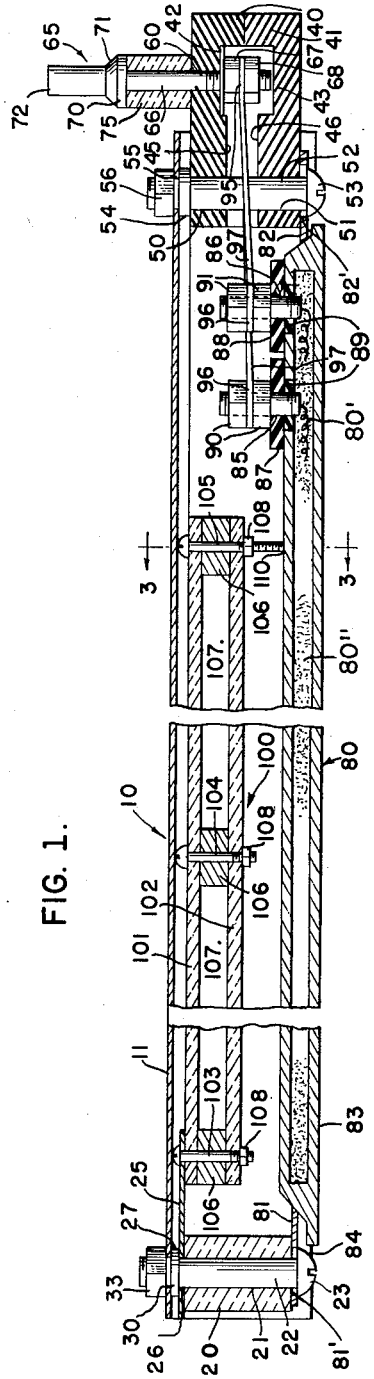
FIG. 1.
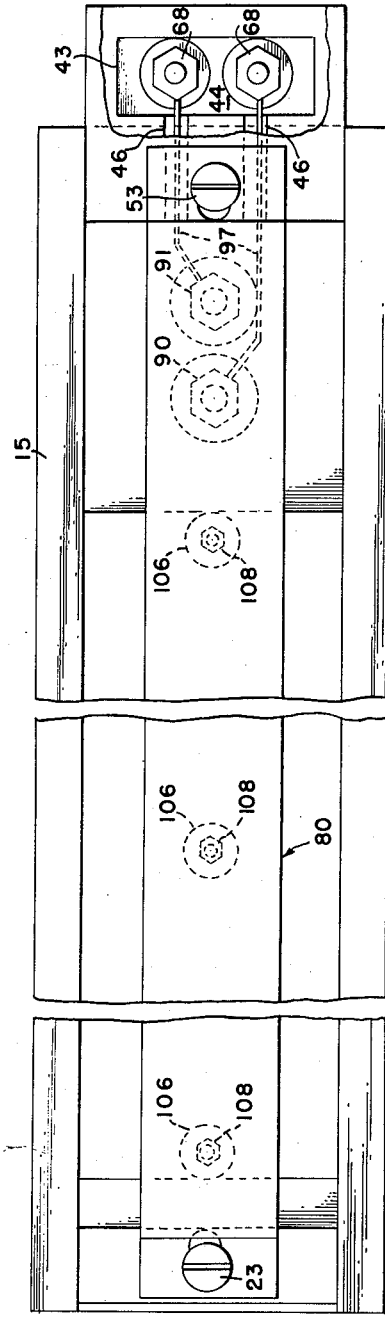
FIG. 2.
FIG. 3.
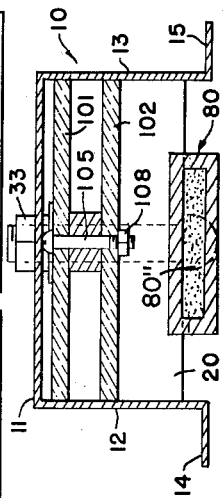
INVENTOR.
LAWRENCE R. VAN NOY
BY PAUL N. CRAIG
*Shoemaker & Mattare*
ATTORNEYS July 31, 1962 L. R. VAN NOY ETAL 3,047,704
STRIP HEATER
Filed April 22, 1959 3 Sheets-Sheet 2
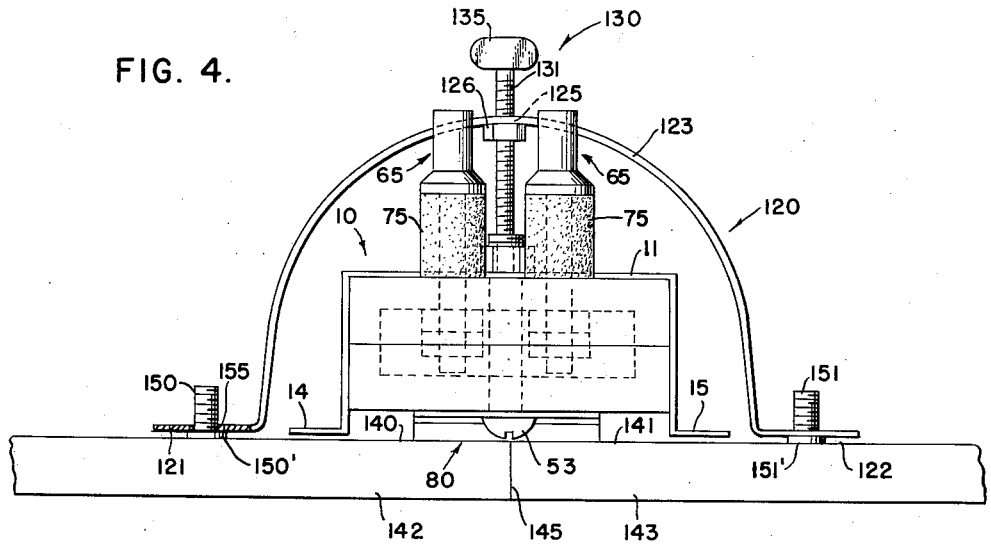
FIG. 4.
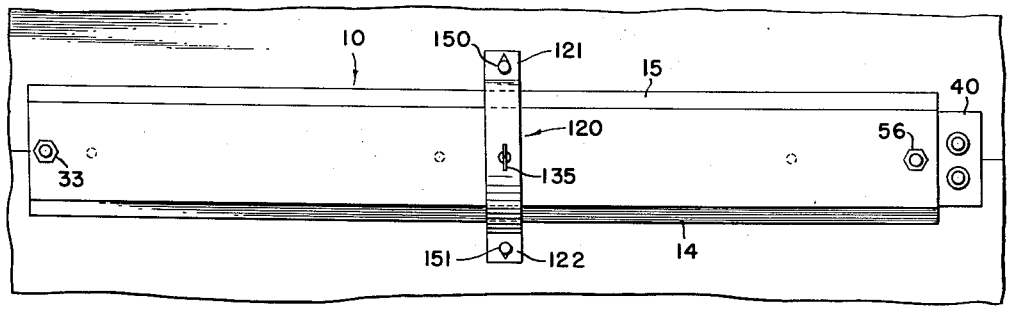
FIG. 5.
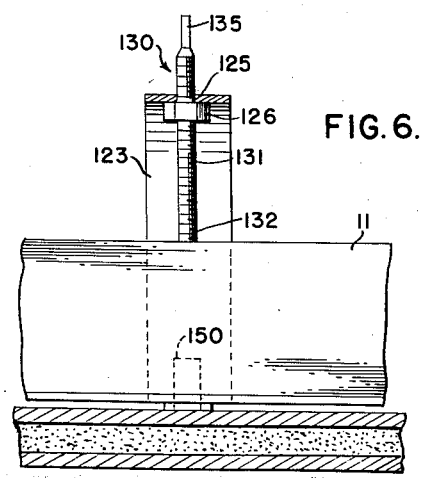
FIG. 6.
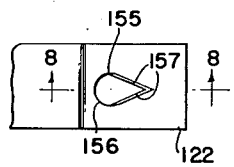
FIG. 7.
FIG. 8.
INVENTORS
LAWRENCE R. VAN NOY
PAUL N. CRAIG
BY
Shoemaker + Mattare
ATTORNEYS

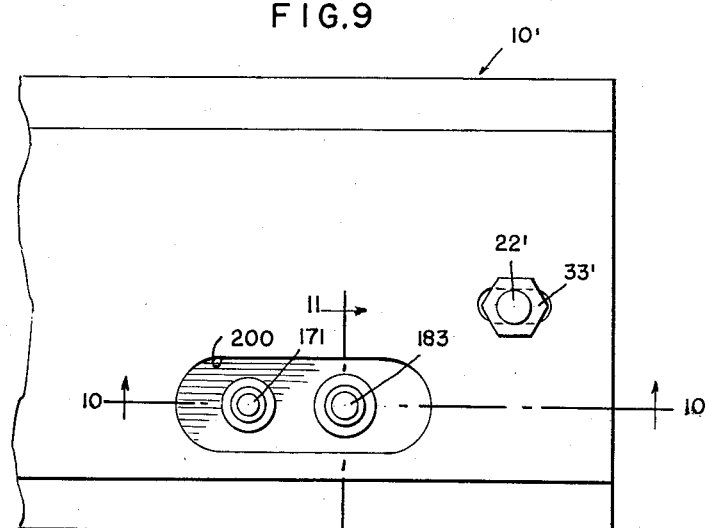
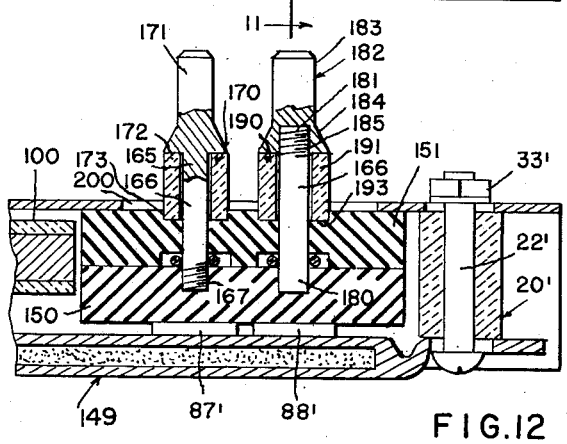
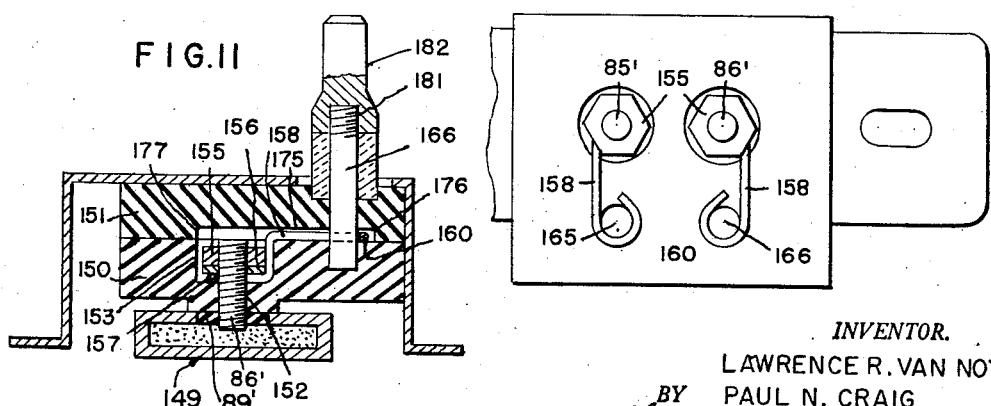

United States Patent Office 3,047,704
Patented July 31, 1962

3,047,704
STRIP HEATER
Lawrence R. Van Noy, Newport News, and Paul N. Craig, Yorktown, Va., assignors to J. B. Nottingham & Co., Inc., New York, N.Y., a corporation of New York
Filed Apr. 22, 1959, Ser. No. 808,130
13 Claims. (Cl. 219—19)

The present invention relates to a new and novel strip heater with hold-down means therefor which provides a very compact arrangement whereby an efficient heating effect is obtained with the strip heater, and the hold-down means permits quick and easy mounting of the apparatus in operative position.

It is a common practice when conducting welding operations with large plates of metal such as in shipbuilding operations to preheat the plates prior to welding. Such preheating is often an essential prerequisite to successful welding, and at times a single strip heater may be employed for heating a plurality of plates stacked upon one another.

Such preheating operations often require an extended period of time in order to obtain proper preheating, and accordingly it is essential to provide an apparatus wherein efficient heating is obtained, and a hold-down means must be provided for fixing the strip heating in operative position such that it does not become displaced accidentally such that it would not properly preheat the desired portions of the plates.

It has been a common practice to merely place a conventional strip-like heating element along the desired portions of material to be heated, such arrangements not being provided with any sort of protective covering or heat insulating means. In addition, rather awkward and bulky hold-down means have been employed for maintaining the heating elements in operative position.

In contrast to such prior art arrangements, the present invention provides a strip heater structure of very compact and efficient design wherein a housing is provided for protecting the remaining components of the device from inclement weather. The heating element is supported within the housing and projects through the lower open portion of the housing in order to properly engage the material to be heated. A heat insulating means is mounted adjacent the upper portion of the housing, this heat insulating means serving to greatly enhance the efficiency of operation of the device since such heat insulation prevents excessive loss of heat from the area above the heating element. In other words, the heat insulating means prevents the radiation of heat through the upper portion of the housing, thereby maintaining the area above and about the heating element at an elevated temperature such that the strip heater is more readily able to bring the associated material up to the desired temperature. The heat insulating means is mounted in a simple and effective manner within the housing.

An electrical insulating means as well as a heat insulating means is provided at one end of the strip heater and a pair of electrical connector plugs are mounted within this insulating means and project upwardly from the strip heater. These connector plugs permit ready connection of the strip heater to an external source of power in a very simple and effective manner. The inner portions of these connector plugs are connected in a suitable manner to the heating element for providing heating current to the device.

A novel hold-down means is employed according to the present invention and includes an elongated member formed of resilient material and having opposite end portions connected by an offset intermediate portion. A clamping means is adjustably mounted by the central portion of the intermediate portion, and is adapted to engage the upper portion of the strip heater for clamping it in operative position.

The opposite end portions of the elongated hold-down member are provided with openings adapted to receive anchor members for fixing the end portions in position. The anchor members may be in the form of studs having grooves therein, and the openings are provided with a pair of sharpened edges which taper toward the outer ends of the hold-down member. These tapered sharpened edges are adapted to engage the grooves in the anchor members for retaining the hold-down member in operative position, the anchor members being spaced apart a greater distance than the cooperating portions of the hold-down member such that the natural resilience of the hold-down member maintains the sharpened edge portions of the opening in engagement within the grooves in the anchor members.

An object of the present invention is the provision of a new and novel strip heater and hold-down means which provides a very efficient heating of the surface to be heated and in addition, permits the heater to be quickly and easily mounted in operative position.

Another object of the invention is the provision of a strip heater including an arrangement for retaining heat in the area adjacent the heating element for increasing the efficiency of heating obtained with the device.

A further object of the invention is to provide a strip heater including a protective housing supporting a heating element in operative position in combination with readily accessible electrical connecting means whereby the power source may be quickly and easily connected to the device.

Yet another object of the invention is the provision of a strip heater which is quite simple, inexpensive, and compact in construction, and yet which is quite efficient and reliable in operation.

A still further object of the invention is to provide a hold-down means for a strip heater which is adapted to clamp the strip heater in operative position without the necessity of providing a separate hold-down means on the strip heater itself.

A further object of the invention is the provision of a strip heater hold-down means which can be mounted in position with a minimum of effort, and which is extremely simple and inexpensive in construction.

Other objects and many attendant advantages of the invention will become more apparent when considered in connection with the accompanying specification and drawings, wherein:

FIG. 1 is a longitudinal sectional view of the strip heater according to the present invention;

FIG. 2 is a bottom view of the device illustrated in FIG. 1;

FIG. 3 is a sectional view taken along lines 3—3 of FIG. 1;

FIG. 4 illustrates the hold-down means employed in conjunction with the strip heater;

FIG. 5 illustrates a strip heater maintained in clamped operative position by a novel hold-down means;

FIG. 6 is a view partially in section illustrating the manner in which the strip heater is clamped in operative position;

FIG. 7 is a top view of one of the end portions of the hold-down means;

FIG. 8 is a sectional view taken along lines 8—8 of FIG. 7 looking in the direction of the arrows;

FIG. 9 is a top view of a modified form of the invention;

FIG. 10 is a sectional view taken along the line 10—10 of FIG. 9 looking in the direction of the arrows;

FIG. 11 is a sectional view taken along line 11—11 of FIG. 9 looking in the direction of the arrows; and FIG. 12 is a top view of the apparatus with certain portions removed.

Referring now to the drawings wherein like reference characters designate corresponding parts throughout the several views, the construction of the strip heater is most clearly seen in FIGS. 1–3, wherein a housing or body means is indicated generally by reference numeral 10, and comprises an upper wall 11 having depending side walls 12 and 13 formed integral therewith, laterally extending flanges 14 and 15 being formed at the lower portions of the side walls. The bottom portion of the housing and the end portions thereof are open, thereby permitting the remaining components to be effectively supported in operative position, yet enabling the housing to protect the apparatus from inclement weather.

Referring now particularly to FIG. 1, a block 20 formed of heat insulating material is mounted at the left end portion of the housing and has a central opening 21 extending therethrough. A bolt 22 having a head 23 at the lower portion thereof projects through opening 21 and extends a substantial distance above the upper surface of block 20. A plate 25 is supported on the upper surface of block 20 and extends laterally therefrom, plate 25 having an opening 26 formed therethrough receiving the stud 22. An insulating washer 27 is mounted between plate 25 and the upper wall 11 of the housing, which has an opening 30 formed therethrough for receiving stud 22. A bolt 33 is secured to the upper end portion of stud 22 for maintaining the complete assembly in operative position.

Referring now to the right-hand end portion of the housing as seen in FIGS. 1 and 2, a pair of insulating blocks 40 and 41 are provided with cut-out portions 42 and 43 respectively, these cut-out portions being in facing relationship to one another to define a cavity 44 therebetween. Insulating blocks 40 and 41 are also provided with a pair of elongated cut-out portions 45 and 46 respectively, these pairs of cut-outs being disposed in facing relationship to one another to define a pair of channels communicating with cavity 44 and extending inwardly to and providing communication with the interior of the housing.

Intermediate the cut-out portions 45 and 46 aligned openings 50 and 51 are provided in insulating blocks 40 and 41 respectively, a stud 52 extending through these aligned openings and projecting a substantial distance above the upper surface of block 40. Stud 52 has an enlarged head 53 on the lower end thereof, a washer 54 being disposed between the upper surface of insulating block 40 and the under surface of wall 11 of the housing. The upper wall 11 of the housing is provided with an opening 55 through which the stud 52 extends, and a bolt 56 is threaded on the upper threaded end of the stud for clamping the apparatus in assembled position.

Upper insulating block 40 is provided with a pair of openings 60, only one of which is visible in FIG. 1, and a pair of similar electrical connector members indicated generally by reference numeral 65 extend through these openings 60. Electrical connectors 65 each include a shank portion 66 having a lower threaded end for receiving thereon a pair of nuts 67 and 68. A shoulder portion 70 is formed adjacent the upper end of the connectors and a tapered surface 71 connects the shoulder portion with the terminal end 72. A tubular member 75 formed of suitable heat insulating material such as a resin material is mounted between the undersurface of shoulder 70 and the upper surface of insulating block 40. The pair of electrical connectors provide a very simple and effective means whereby the apparatus may be quickly and easily connected to an external source of power.

A heating element indicated generally by reference numeral 80 is of conventional construction, being formed of a suitable heat conductive metallic substance such as stainless steel, the interior of the heating element being hollow and having a Nichrome heating wire 80' or the like therein, the heating wire being embedded in a suitable dielectric powder 80", this construction being conventional. The heating element is provided with longitudinally projecting ears 81 and 82 at opposite ends thereof, these ears being provided with openings 81' and 82' therein respectively for receiving the studs 22 and 52 respectively. It is apparent that the studs maintain the heating element in operative position as well as the remaining components, the lower surface 83 of the heating element projecting slightly below the lower surface 84 of the housing.

A pair of studs 85 and 86 are electrically connected to the heating wire within the heating element and extend upwardly from the upper surface of the heating element, washers 87 and 88 being disposed about the lower portions of the studs and being formed of a suitable electrical insulating material such as mica or the like. An annular insulator 89 formed of a suitable insulating material such as Bakelite or the like is disposed about the lower ends of each of studs 85 and 86 and serves to insulate the studs from the upper wall of the heating element 80. A pair of nuts 90 are mounted on stud 85 and a pair of nuts 91 are mounted on stud 86. Suitable wires 97 are employed to connect the electrical inlet connectors 65 with the studs 85 and 86, opposite ends 95 and 96 of the wires being wrapped around the connectors and the studs respectively. These wires are formed of a good electrical conductor such as Nichrome or stainless steel or the like which does not deteriorate at high temperature.

A heat insulating means indicated generally by reference numeral 100 is mounted at the upper portion of the housing and includes a pair of spaced members 101 and 102 formed of suitable heat insulating material such as transite board, the members 101 and 102 each having three openings formed therein and aligned with one another for receiving three bolts 103, 104, and 105 therethrough. Each of these bolts passes through a spacer member 106 which may likewise be formed of transite board to provide an air space 107 between the spaced members 101 and 102. Bolts 108 are threaded onto the lower end portions of the three bolts 103, 104, and 105, for maintaining the spaced members 101 and 102 in operative position. It should be noted that plate 25 extends beneath the head of bolt 103 for supporting the left end portion of the heat insulating means 100 in operative position. Bolt 105 is elongated, the lower end portion 110 thereof being disposed in abutting relationship with the upper surface of the heating element for supporting the right-hand end portion of the heat insulating means in operative position. The upper portions of each of bolts 103, 104, and 105 engage the under surface of the top wall 11 of the housing.

It is apparent that the aforedescribed strip heater is composed of a number of separate components which can be quickly and easily assembled or disassembled from one another, thereby facilitating maintenance and replacement of the various members thereof. The construction also provides a very compact arrangement when in assembled position such that the heating element is effectively supported in operative position, and is electrically and heat insulated from the remaining components of the apparatus.

Referring now to FIGS. 4–8 of the drawings, a hold-down means is illustrated for use in conjunction with the novel strip heater of the present invention. The hold-down means comprises an elongated hold-down member indicated generally by reference numeral 120 and includes opposite end portions 121 and 122 interconnected with one another by an intermediate opposite portion 123 which as shown in the drawing is of substantially U-shaped configuration, although intermediate portion 123 need not necessarily be arcuate in configuration, but it may also be rectangular or of a similar configuration as well, as it provides an offset portion adapted to extend above and in spanning relationship to the body of the strip heater, and yet provides a resilient mounting for the end portions thereof such that they are resiliently maintained in a predetermined spaced relationship to one another.

An opening 125 is provided within the central part of intermediate portion 123 of the hold-down means, and an internally threaded nut 126 is secured to the undersurface of portion 123 immediately below opening 125. The purpose of nut 126 is to provide a threaded opening in the central portion of the hold-down means, although it is evident that opening 125 may also be suitably threaded if desired.

A clamping means indicated generally by reference numeral 130 comprises a bolt having an elongated threaded shank 131, the lower end 132 of which, as seen most clearly in FIG. 6 is adapted to engage the upper wall 11 of the housing of the strip heater. Bolt 130 is received within the aligned openings formed in the hold-down means and threaded nut 126 respectively. The upper end of bolt 130 is provided with a wing-type head 135 which facilitates grasping within the fingers whereby the bolt 130 may be turned and adjusted with respect to the hold-down means. As seen most clearly in FIG. 4, the housing 10 of the strip heater is mounted upon the upper surfaces 140 and 141 of two adjacent pieces of material 142 and 143 respectively which are abutted against each other along line 145 which is to be welded together to form a seam between the two pieces of material. Heating element 80 of the strip heater is mounted in operative position such that it is supported upon the upper surfaces 140 and 141, the heating element being disposed along substantially equal areas on either side of the seam 145, whereby it is adapted to heat the adjacent portions of the two pieces of material. It should be noted that when in operative position, the flanges 14 and 15 of the housing are spaced slightly above the surfaces 140 and 141 respectively.

In order to clamp the strip heater in operative position, a pair of similar anchor members 150 and 151 are secured as by welding to the surfaces 140 and 141 of the pieces of material to be heated, anchor members 150 and 151 preferably comprising conventional studs commonly used with stud welding guns and being provided with heads 150′ and 151′ respectively.

Each of the end portions 121 and 122 are provided with similar openings therein, FIGS. 7 and 8 illustrating the opening provided in end portion 122, it being understood that the opening provided in end portion 121 is identical except that it is the reverse arrangement as the opening provided in end portion 122 as more fully explained hereinafter.

Openings 155 provided in each of the end portions of the hold-down means each includes an arcuate portion 156 adjacent the intermediate opposite portion of the hold-down means, the opposite side of the openings comprise a pair of sharpened edges 157 which taper toward the outer ends of the respective end portions. The anchor members 150 and 151 are each provided with grooves therein either in the form of conventional screw threads, or other suitable type grooves within which the sharpened tapered edges 157 of the openings are received. It is evident that when these edges 157 are disposed within the grooves in the anchor members, the end portions of the hold-down means will be firmly fixed in position.

Hold-down means 120 is formed of a suitable resilient material such as spring steel, and anchor members 150 and 151 are spaced from one another a sufficient distance such that it is necessary to spring the opposite end portions 121 and 122 of the hold-down means away from one another in order to enable anchor members 150 and 151 to pass through the openings 155 therein. After inserting the anchor members within the openings, the inherent resilence of the hold-down means causes the end portions 121 and 122 thereof to be resiliently urged toward one another thereby causing the sharpened edges 157 to be resiliently urged into the grooves in the anchor members.

It is evident that the hold-down means according to the present invention incorporates a very simple and compact arrangement which positively locks the hold-down means in position such that the intermediate portion thereof is spaced above and in spanning relationship to the strip heater. Simple threading movement of bolt 130 comprising the clamping means urges the lower end of the bolt into engagement with the upper surface of the top wall of the housing of the strip heater thereby firmly clamping the strip heater against the associated surface to be heated such that the strip heater is securely maintained in operative position. It is apparent that a single hold-down means is adequate for maintaining the strip heater in operative position, although a plurality of hold-down means may be associated with a single strip heater for more securely clamping the strip heater in operative position. It is evident that after the pieces of material 142 and 143 have been heated, the strip heater may be removed as well as the hold-down means, and the anchor members removed from the heated material.

Referring now to FIGS. 9–12 of the drawings, a modification of the invention is illustrated wherein a more compact arrangement is provided such that the electrical connectors are spaced inwardly of the position shown in FIG. 1, and wherein the electrical connector assembly does not extend outwardly beyond the end portion of the body means. As shown in FIGS. 9–12, only the right-hand end portion of the device shown in FIG. 1 has been modified, the remainder of the apparatus being identical with that shown in FIG. 1. The heating element 149 of the modified structure is identical with heating element 80 shown in FIG. 1, and the heat insulating means 100 is also identical with that shown in FIG. 1, the major difference lying in the fact that the end portion of heat insulating means 100 in the modified device is shown closely adjacent the insulating blocks within which the electrical connectors are mounted.

The right-hand end portion of the heating element in the modification as seen particularly in FIG. 10 is spaced and supported from the right-hand end portion of the upper wall of the body means by an insulating block 20′ similar to block 20 shown in FIG. 1, the insulating block being maintained in position as shown by a stud 22′ extending through suitable openings provided in the insulating block, the heating element and the body means, and retained by nut 33′ threaded on the upper end thereof. It is accordingly evident that the outermost portion of the right-hand end of the apparatus as seen in FIG. 10 is similar to that of the left-hand portion of the device shown in FIG. 1. Studs 85′ and 86′ are similar to studs 85 and 86 shown in FIG. 1, and extend upwardly from the heating element 80′. A pair of insulating blocks 150 and 151 are supported above the upper surface of the heating means 85, washers 87′ and 88′ being mounted about the lower portions of studs 85′ and 86′ respectively, and engaging the undersurface of the lower insulating block 150 for supporting it in position as shown.

A pair of similar openings 152 are provided in the lower surface of insulating block 150 for receiving the studs 85′ and 86′. Openings 152 are in communication with cavities 153 and open into the central portion thereof, the studs extending upwardly within these cavities. The upper ends of each of studs 85′ and 85′ are threaded, and nuts 155 are threaded thereon, washers 156 being disposed within each of nuts 155 for urging the washers downwardly into contact with the end portion 157 of wires 158 formed of Nichrome or stainless steel and the like, end portion 157 being preferably wrapped around studs 85′ and 86′ for providing good electrical contact therewith. The opposite ends 160 of each of wires 158 are wrapped around a pair of electrical connector studs 165 and 166, and are in intimate contact therewith for providing a good electrical connection therebetween.

Electrical connector studs 165 and 166 are of different construction and serve different purposes. Stud 165 includes a shank portion 166, the lower end of which is threaded within a correspondingly threaded opening 167 formed in the upper surface of insulating block 150. An enlarged shoulder portion 170 is formed at an intermediate portion of stud 165 and an upper reduced portion 171 is provided for engaging a suitable plug. A tubular sleeve 172 formed of suitable heat-insulating material such as a resinous material is disposed between the undersurface of shoulder 170 and the bottom of a depression 173 formed in the upper surface of insulating block 151 for receiving the sleeve. It should be noted that as seen in FIGS. 10 and 11, the under surface of insulating block 151 is provided with a pair of cut-out portions associated with each of the studs, each of these cut-out portions 175 being elongated and extending from a point 176 adjacent the stud to a point 177 adjacent the wall portion of cavity 153 in insulating block 150 such that the cut-out portions 175 provide channels within which the wires 158 extend.

Connector stud 166 has the lower end 180 thereof embedded within insulating block 150 to facilitate clamping of the upper insulating block 151 against lower insulating block 150. The upper end portion 181 of stud 166 is threaded, and a connector member 182 is threaded thereon, member 181 including an upper reduced portion 183 for engaging a suitable plug, the intermediate portion 184 of the connector 182 flaring outwardly and having a threaded opening 185 formed therewithin which is threaded upon the upper end of connector 166. Intermediate portion 184 includes a downwardly facing shoulder 190 which engages the upper edge of a heat-insulating sleeve 191 similar to sleeve 172, the lower end portion of sleeve 191 being seated within a recess 193 provided in the upper surface of insulating block 151. While a pair of insulating blocks 150 and 151 have been illustrated, these blocks may be confined in a single molded integral insulating block if desired.

Referring now to FIG. 9, the end portion of the modified body means 10' is provided with an elongated slot 200 formed in the upper wall thereof and disposed adjacent one lateral edge thereof, the upper end portions 171 and 183 of the electrical connectors extending upwardly through this opening whereby the insulating blocks 150 and 151 may be mounted within a body means as seen in FIG. 10, and yet ready access is provided to the electrical connector plugs.

It is evident that the arrangement shown in FIGS. 9-12 provide a substantial reduction in the overall size of the apparatus, and is a more compact arrangement since the electrical insulating blocks are mounted completely within the body means and do not project beyond the end portions thereof. This is an important feature since it enables the strip heater to be disposed in closely adjacent end-to-end relationship such that the heating elements are in proximity to one another and no cold spots are developed in the material which is being heated.

It is apparent from the foregoing that the present invention provides a new and novel strip heater and hold-down means which provides a very efficient heating of the surface to be heated, and permits the heater to be quickly and easily mounted into operative position by first preferably mounting the hold-down means in operative position and then sliding the strip heater into place beneath the hold-down means and urging the clamping means into engagement with the strip heater.

The strip heater according to the present invention provides an arrangement which efficiently retains heat in the area adjacent the heating element by the provision of a heat insulating means supported within the housing spaced closely above the heating element and providing an air space therebetween. It is also evident that a lower surface of the insulating means may be formed as a reflective surface in order to enhance the heating effect obtained with the heating element. The housing associated with the strip heater serves to protect the components from inclement weather, and it is apparent that a very readily accessible electrical connection is provided at one end of the housing by which an external source may be readily connected to the strip heater. The strip heater according to the present invention is quite simple, effective and inexpensive in construction and yet is quite efficient and reliable in operation.

The hold-down means is also quite simple and inexpensive in construction, and provides a positive means for retaining the strip heater in operative position without the necessity of providing any special hold-down means on the strip heater itself, and provides an arrangement which can be quite quickly and easily mounted in position.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. In combination, an elongated strip heater including a body means having upper and lower portions, a heating element supported by said body means and projecting below the lower portion of the body means for contacting a surface to be heated, and a hold-down means including an integral member disposed in spanning relationship to said body means and having opposite end portions adapted to be fixed relative to the surface to be heated, said hold-down means including a clamping means supported by said integral member and engaging said strip heater for maintaining a strip heater in operative position relative to the surface to be heated.

2. Apparatus as defined in claim 1, wherein said clamping means is in abutting engagement with the outer portion of said body means for urging the heating element into frictional engagement with the surface to be heated.

3. In combination, an elongated strip heater including a body means having upper and lower portions, a heating element supported by said body means and projecting below the lower portion thereof, and a hold-down means for said strip heater including an elongated member having an intermediate portion and opposite end portions, said opposite end portions being adapted to be fixed relative to the surface to be heated, said intermediate portion having a clamping means mounted thereon, said clamping means made adjustable relative to said intermediate portion, said intermediate portion being spaced above the upper portion of said body means and in spanning relationship thereto, the lower portion of said clamping means being operatively connected to the upper portion of said body means for urging said body means toward the surface to be heated and clamping the strip heater in operative position.

4. Apparatus as defined in claim 3, wherein said intermediate portion of the hold-down means includes an opening formed therethrough, said clamping means including a threaded shaft threadedly mounted in said opening whereby said threaded shaft may be adjusted relative to said intermediate portion of the hold-down means.

5. In combination, an elongated strip heater including a body means having an upper and a lower portion, a heating element supported within said body means and projecting below said lower portion, a hold-down means for said strip heater comprising an elongated member having an intermediate portion disposed in spanning relationship to said body means, a clamping means adjustably supported by said intermediate portion of the elongated member and having a lower end portion adapted to engage the upper portion of the means for clamping the body means in operative position, the opposite end portions of said hold-down means each including an opening formed therethrough, said opening including a tapered sharpened edge portion for engaging an anchor member to retain the hold-down means in operative position.

6. Apparatus as defined in claim 5, wherein said intermediate portion of the hold-down means is substantially U-shaped and extends over the upper portion of said body means.

7. In combination, a strip heater including an elongated body means having an upper and a lower portion, a heating element supported within said body means and projecting below the lower portion thereof, heat insulating means mounted within said body means adjacent the outer portion thereof, electrical inlet means mounted at one end of said body means and projecting outwardly of the body means to permit ready connection to an external power source, means within said body means providing an electrical connection between said heating element and said electrical inlet means including an integral member, and a hold-down means disposed in spanning relationship to said body means and extending on opposite sides thereof to provide opposite end portions for engaging anchor members, said hold-down means including a portion operatively connected to said body means.

8. In combination, a strip heater comprising an elongated housing having an upper and a lower portion, the lower portion of the housing being open, a heating element supported within said housing and projecting through the open lower portion thereof, a hold-down means including an integral member having opposite end portions adapted to engage anchor members for holding the ends of the hold-down means in fixed position, the integral member including an intermediate portion of arcuate configuration disposed in spanning relationship to said housing and spaced above the upper portion of the housing, a clamping means being adjustably mounted at the central portion of said intermediate portion, the lower portion of said clamping means being adapted to clampingly engage the upper portion of said housing.

9. A strip heater comprising an elongated housing having upper and lower portions, the lower portion of said housing having an opening formed therein, a heating element supported within said housing upon insulated elements and projecting through the opening in the lower portion of the housing and projecting slightly below the lower portion of said housing, heat insulating means supported adjacent the upper portion of the housing for retaining heat in the area adjacent said heating element, externally exposed electrical connector means supported at one end of said housing, and means providing electrical connection between said electrical connector means and said heating element.

10. Apparatus as defined in claim 9, wherein said strip heater is an elongated member, said member including a longitudinally extending attaching ear at each end thereof for mounting the heating element in operative position.

11. A strip heater comprising an elongated housing having an upper and a lower portion, the housing being open at the lower portion thereof, insulating means mounted at opposite ends of said housing, a heating element projecting through the open bottom portion of the housing and extending beneath the lower portion of the housing, opposite end portions of said heating element being supported by said insulating means, a heat insulating means supported within said housing adjacent the upper portion thereof and overlying said heating element for retaining heat in said housing adjacent said heating element, electrical connector means mounted at one end of said housing, and means providing electrical connection between said electrical connector means and said heating element.

12. Apparatus as defined in claim 11, wherein said electrical connector means comprises a pair of plug members projecting upwardly from the upper surface of the strip heater to permit ready connection of an external power source to the strip heater.

13. A strip heater comprising an elongated housing having upper and lower portions, the lower portion of said housing having an opening formed therein, a heating element supported by said housing and projecting through the opening in the lower portion of the housing and extending below the lower portion of the housing, heat-insulating means supported adjacent the upper portion of the housing for retaining heat in the area adjacent said heating element, electrical connector means connected to one portion of said heating element, an opening provided within the upper portion of said housing, said electrical connector means extending upwardly through said last-mentioned opening and projecting above the upper surface of the housing for facilitating electrical connection thereto, said electrical connector means being supported within insulating block means, said insulating block means being disposed completely inwardly of the adjacent end portion of the housing and being disposed closely adjacent one end portion of said heat-insulating means.

References Cited in the file of this patent

UNITED STATES PATENTS

| 1,365,368 | Bliss | Jan. 11, 1921 |
| 1,779,681 | Smith et al. | Oct. 28, 1930 |
| 2,082,551 | Raney | June 1, 1937 |
| 2,407,683 | Prentice | Sept. 17, 1946 |
| 2,461,198 | Chiger | Feb. 8, 1949 |
| 2,668,896 | Husaczka et al. | Feb. 9, 1954 |
| 2,748,252 | Williams et al. | May 29, 1956 |
| 2,834,468 | Thomas et al. | May 13, 1958 |
| 2,877,332 | Senior | Mar. 10, 1959 |
| 2,917,616 | Thomson | Dec. 15, 1959 |